United States Patent
Fan et al.

(10) Patent No.: US 8,657,988 B2
(45) Date of Patent: Feb. 25, 2014

(54) METHOD FOR APPLYING CARBON NANOTUBE FILM

(71) Applicants: Tsinghua University, Beijing (CN);
Hon Hai Precision Industry Co., Ltd., New Taipei (TW)

(72) Inventors: Shou-Shan Fan, Beijing (CN); Liang Liu, Beijing (CN); Li Qian, Beijing (CN)

(73) Assignees: Tsinghua University, Beijing (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/730,875

(22) Filed: Dec. 29, 2012

(65) Prior Publication Data

US 2013/0133823 A1   May 30, 2013

Related U.S. Application Data

(63) Continuation of application No. 12/846,828, filed on Jul. 30, 2010, now Pat. No. 8,365,793.

(30) Foreign Application Priority Data

Dec. 31, 2009   (CN) .......................... 2009 1 0239665

(51) Int. Cl.
*B32B 37/00* (2006.01)
*B32B 38/04* (2006.01)
*B32B 38/10* (2006.01)
*B29C 65/00* (2006.01)

(52) U.S. Cl.
USPC .......... 156/270; 156/229; 156/167; 156/169; 156/181; 997/848

(58) Field of Classification Search
USPC ......... 156/167, 181, 256, 263, 229, 269, 270, 156/296, 272.8; 977/848
See application file for complete search history.

(56) References Cited

U.S. PATENT DOCUMENTS

| | | | | |
|---|---|---|---|---|
| 7,744,793 B2 * | 6/2010 | Lemaire et al. | ........... | 264/172.19 |
| 7,850,778 B2 * | 12/2010 | Lemaire | ........................ | 118/715 |
| 7,992,616 B2 * | 8/2011 | Liu et al. | ........................ | 156/495 |
| 8,435,374 B2 * | 5/2013 | Feng et al. | ..................... | 156/229 |

* cited by examiner

*Primary Examiner* — Linda L. Gray
(74) *Attorney, Agent, or Firm* — Altis Law Group, Inc.

(57) ABSTRACT

A method for applying carbon nanotube films is provided. The method includes the following steps. At least one pre-laid supporter is placed on a film application device including a rotation axis and a rotator. The rotator is capable of rotating about the rotation axis, and includes a number of support surfaces, wherein the at least one pre-laid supporter is attached on the plurality of support surfaces. A carbon nanotube film is drawn from a carbon nanotube array that is supported by a supplier. One end of the carbon nanotube film away from the carbon nanotube array is adhered to one of the at least one pre-laid supporter. The rotator is rotates about the rotation axis such that the carbon nanotube film is applied on the at least one pre-laid supporter; and cutting the carbon nanotube film with a cutter.

20 Claims, 3 Drawing Sheets

METHOD FOR APPLYING CARBON NANOTUBE FILM

RELATED APPLICATIONS

This application is a continued application of U.S. patent application, entitled "APPARATUS AND METHOD FOR MAKING CARBON NANOTUBE FILM USING THE SAME" with application Ser. No. 12/846,828, filed on Jul. 30, 2010. U.S. patent application Ser. No. 12/846,828, claims all benefits accruing under 35 U.S.C. §119 from China Patent Application No. 200910239665.7, filed on Dec. 31, 2009 in the China Intellectual Property Office, the disclosure of which is incorporated herein by reference.

BACKGROUND

1. Technical Field

The present disclosure relates to an apparatus and a method for applying carbon nanotube film using the same.

2. Discussion of Related Art

Carbon nanotube films are composed of carbon nanotubes and convenient for many applications, so they have attracted a lot of attention recently. Nowadays, methods for making carbon nanotube film include chemical vapor deposition methods, spraying methods or Langmuir Blodgett (LB) methods. However, these methods for making carbon nanotube films are limited to laboratory use, and so are not suitable for use in a mass production setting. Additionally, it is difficult to make a free-standing carbon nanotube films by the abovementioned methods.

An example is shown and discussed in China Patent Publication No. 101407312A, entitled "APPRATUS AND METHOD FOR MAKING CARBON NANOTUBE FILM", to Liu et al. on Apr. 15, 2009. This application discloses an apparatus and a method for making a carbon nanotube film. The carbon nanotube film is composed of carbon nanotubes which substantially arranged at a same direction, and the carbon nanotube film can be a free-standing structure. However, in the apparatus and method for making the carbon nanotube film, the carbon nanotube film cannot be laid on a supporter consecutively, and the efficiency of applying carbon nanotube film by the above apparatus and method is low.

What is needed, therefore, is to provide an apparatus and method for applying a carbon nanotube film consecutively, and can improve the efficiency of applying the carbon nanotube film.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
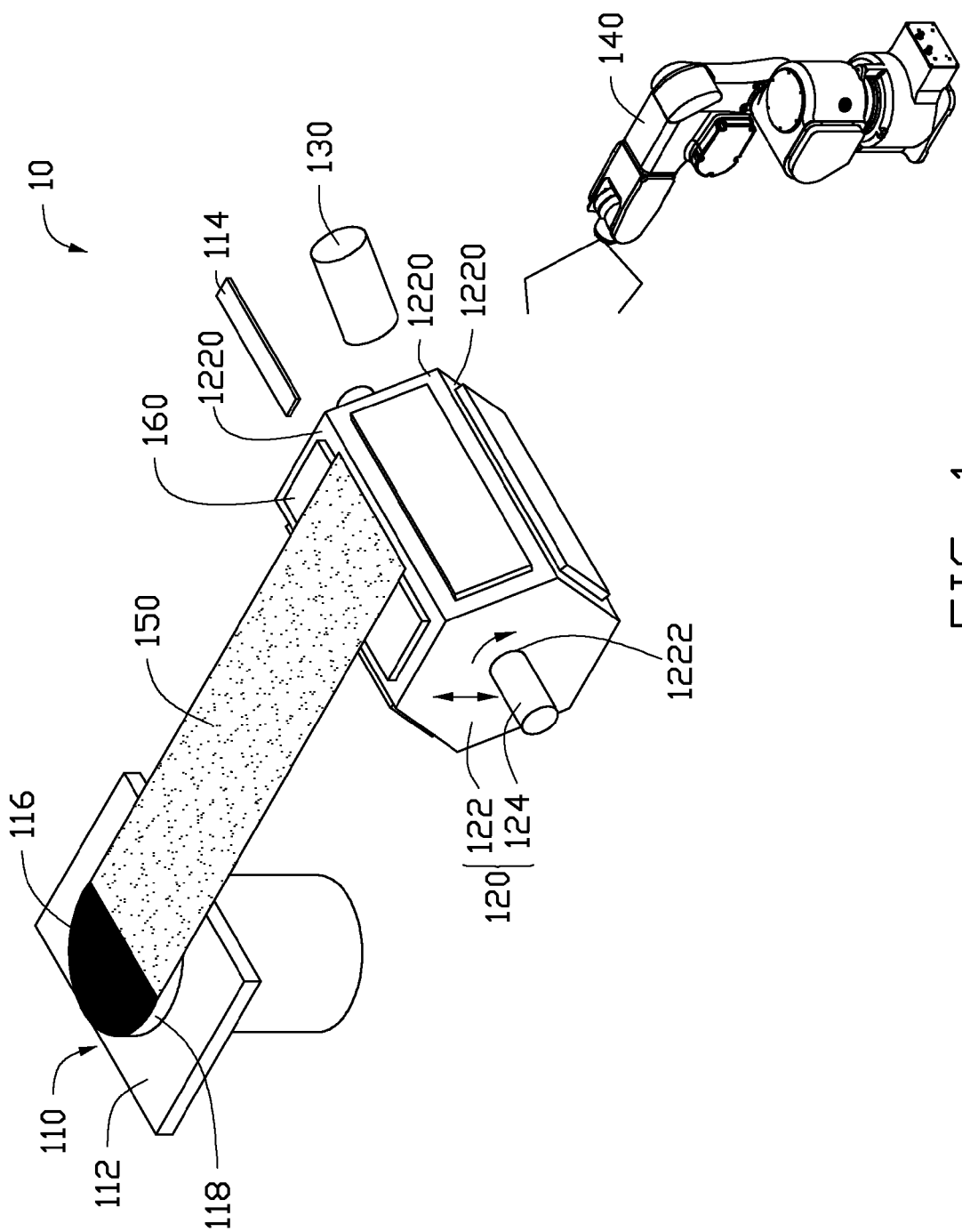
FIG. 1 is a schematic view of an apparatus for applying a carbon nanotube film according to one embodiment.

Referring to FIG. 1, an apparatus 10 for applying carbon nanotube film according to one embodiment includes a supplier 110, an applying film device 120, a cutter 130 and at least one mechanical arm 140.

The supplier 110 is configured for placing a carbon nanotube array 116. The carbon nanotube array 116 supplies a consecutive carbon nanotube film 150 to the film application device 120. The supplier 110 includes a specimen holder 112 and a drawing tool 114. The specimen holder 112 can be used for fixing a carbon nanotube array 116 by means of, such as clasps, adhesive, adhesive tape or vacuum suction. The drawing tool 114 can be configured for drawing the carbon nanotube film 150 from the carbon nanotube array 116. The drawing tool 114 can be an adhesive tape, a ruler, a tweezers or other tools. In one embodiment, the carbon nanotube array 116 is grown on a substrate 118. The substrate 118 with the carbon nanotube array 116 is fixed on the specimen holder 112 by clasps.

The film application device 120 is configured for laying the carbon nanotube film 150. The film application device 120 includes a rotation axis 124 and a rotator 122 rotatable about the rotation axis 124. The rotator 122 has a plurality of support surfaces 1220. Each support surface 1220 can have a pre-laid supporter 160 attached thereto by means of clasps, adhesion, vacuum suction or other fixation means. The pre-laid supporter 160 is used to support the carbon nanotube film 150. The plurality of support surfaces 1220 can rotate about the rotation axis 124 any desired number of degrees.

The rotation axis 124 can be substantially perpendicular to a drawing direction of the carbon nanotube film 150 and substantially parallel to a surface of the carbon nanotube film 150. Wherein a drawing angle is a sharp angle which is formed between the drawing direction and the carbon nanotube array 116. The drawing angle is in a range from about 60 degrees to about 90 degrees, which is conducive to form uniform and continuous carbon nanotube film. If the drawing angle exceeds the range, the carbon nanotube film may not be uniformly and continuously formed from the carbon nanotube array. The rotation axis 124 can be moveable up and down along a direction substantially perpendicular to the surface of the carbon nanotube film 150 by a control device, such as a spring, or an axletree. The rotator 122 can be moveable up and down along the direction substantially perpendicular to the surface of the carbon nanotube film 150 following the moving of the rotation axis 124. Displacements of the rotator 122 are the same as that of the rotation axis 124 so that the carbon nanotube film 150 can be kept at a same level during a process of applying the carbon nanotube film 150. The drawing angle will be kept at the same angle and maintained in the range from about 60 degrees to about 90 degrees. Therefore, the carbon nanotube film can be formed uniformly, continuously. This will help prevent the carbon nanotube film 150 from fracturing.

In one embodiment, the rotator 122 can be a prism. A through hole 1222 is defined in the center of the prism. The rotator 122 can rotate about the rotation axis 124, which extends through the through hole 1222. The prism can be a triple prism, a square prism, a pentagonal prism, a hexagonal prism, a heptagonal prism or other prisms, and can be selected as desired. In one embodiment, the rotator 122 is a hexagonal prism having six side faces. The six side faces are support surfaces 1220. In one embodiment, the rotator 122 and the rotation axis 124 can be an integrated structure. The rotation axis 124 is used for driving the rotator 122 to rotate, and the rotator 122 can rotate following the rotation axis 124.

Figure 2:
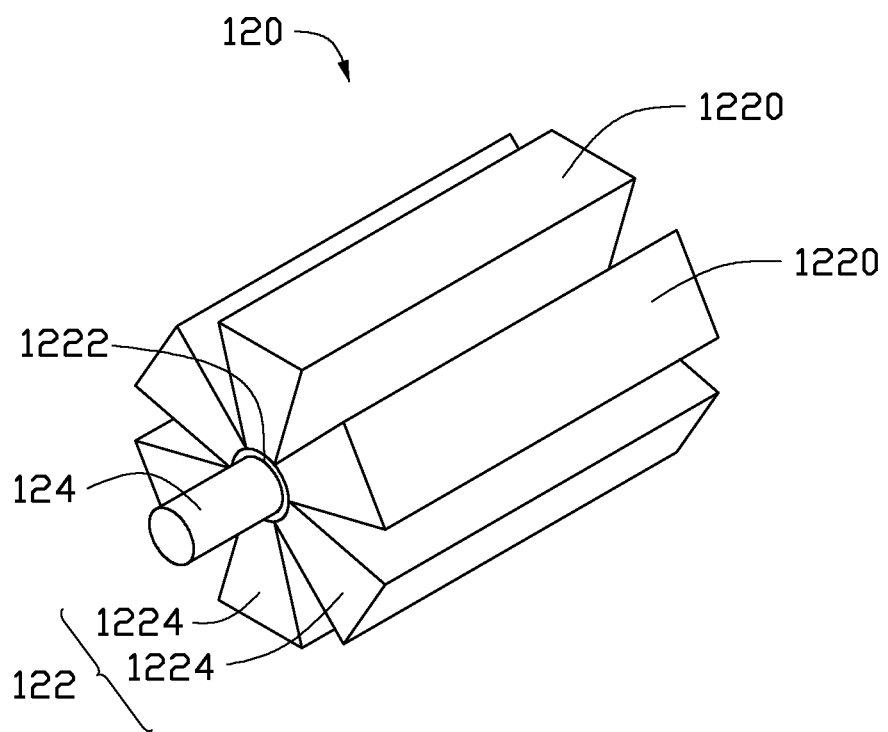
FIG. 2 is a schematic view of a film application device of an apparatus for applying a carbon nanotube film according to one embodiment.

In one embodiment, referring to FIG. 2, the rotator 122 can have a plurality of supporting structures 1224. The plurality of supporting structures 1224 surrounds the rotation axis 124. One end of each supporting structure 1224 is fixed on the rotation axis 124, and the other end is away from the rotation axis 124 to form the support surface 1220. The rotation axis 124 extends in the center of the plurality of support surfaces 1220. The plurality of support surfaces 1220 is spaced from each other, and can be substantially parallel to the rotation axis 124. A cross section of each support surface 1224 is substantially perpendicular to the rotation axis 124. The cross section can be a triangle shaped, a rectangle shaped, a T shaped, a trapezoid shaped or any other shape. In one embodiment, the cross section is a trapezoid shaped. A shape of the rotator 122 is not limited as the above mentioned shape, only if it can form the support surfaces 1220 to place the pre-laid supporters 160. The pre-laid supporter 160 can be placed on one support surface 1220 or two adjacent support surfaces 1220.

It can be understood that the plurality of support surfaces 1220 of the rotator 122 can have different sizes and shapes, can have the same sizes and shapes.

When the film application device 120 is operated, the rotator 122 rotates about the rotation axis 124, which can continuously draw the carbon nanotube film 150 away from the carbon nanotube array 116, to continuously make the carbon nanotube film 150. The carbon nanotube film 150 firstly contacts a side of the pre-laid supporter 160 and gradually is completely applied to the pre-laid supporter 160. Such that, an angle between the carbon nanotube film 150 and the pre-laid supporter 160 is gradually reduced. Thus, air between the carbon nanotube film 150 and the pre-laid supporter 160 can be effectively removed, the carbon nanotube film 150 can be uniformly laid on the pre-laid supporter 160, and is not prone to be folded, such as, cannot form black lines. Black lines have greater densities than that of unfolded parts of the carbon nanotube film 150.

The cutter 130 can be controlled by hand to cut the carbon nanotube film 150, or can be controlled by a computer program to automatically cut the carbon nanotube film 150. In one embodiment, the cutter 130 is a laser device, the laser device is controlled by a computer program to automatically cut the carbon nanotube film 150 between adjacent two supporter surfaces 1220 of the rotator 122.

The at least one mechanical arm 140 can be configured for moving the at least one pre-laid supporter 160 or at least one laid supporter 170. Specifically, the at least one mechanical arm 140 can install the at least one pre-laid supporter 160 on the plurality of support surfaces 1220 of the rotator 122 and/or remove the at least one laid supporter 170 from the plurality of support surfaces 1220. In one embodiment, the applying film apparatus 10 includes only one mechanical arm 140. In another embodiment, the applying film apparatus 10 includes a plurality of mechanical arms 140. The plurality of mechanical arms 140 can be operated at the same time; for example, a part of the plurality of mechanical arms 140 is used to install the at least one pre-laid supporter 160 on the support surface 1220 of the rotator 122, another part of the plurality of mechanical arms 140 is used to remove the at least one laid supporter 170 from the support surface 1220 of the rotator 122.

It can be understood that the at least one mechanical arm 140 is an optional tool, and can be substituted by clamps, human hands or other means.

Figure 3:
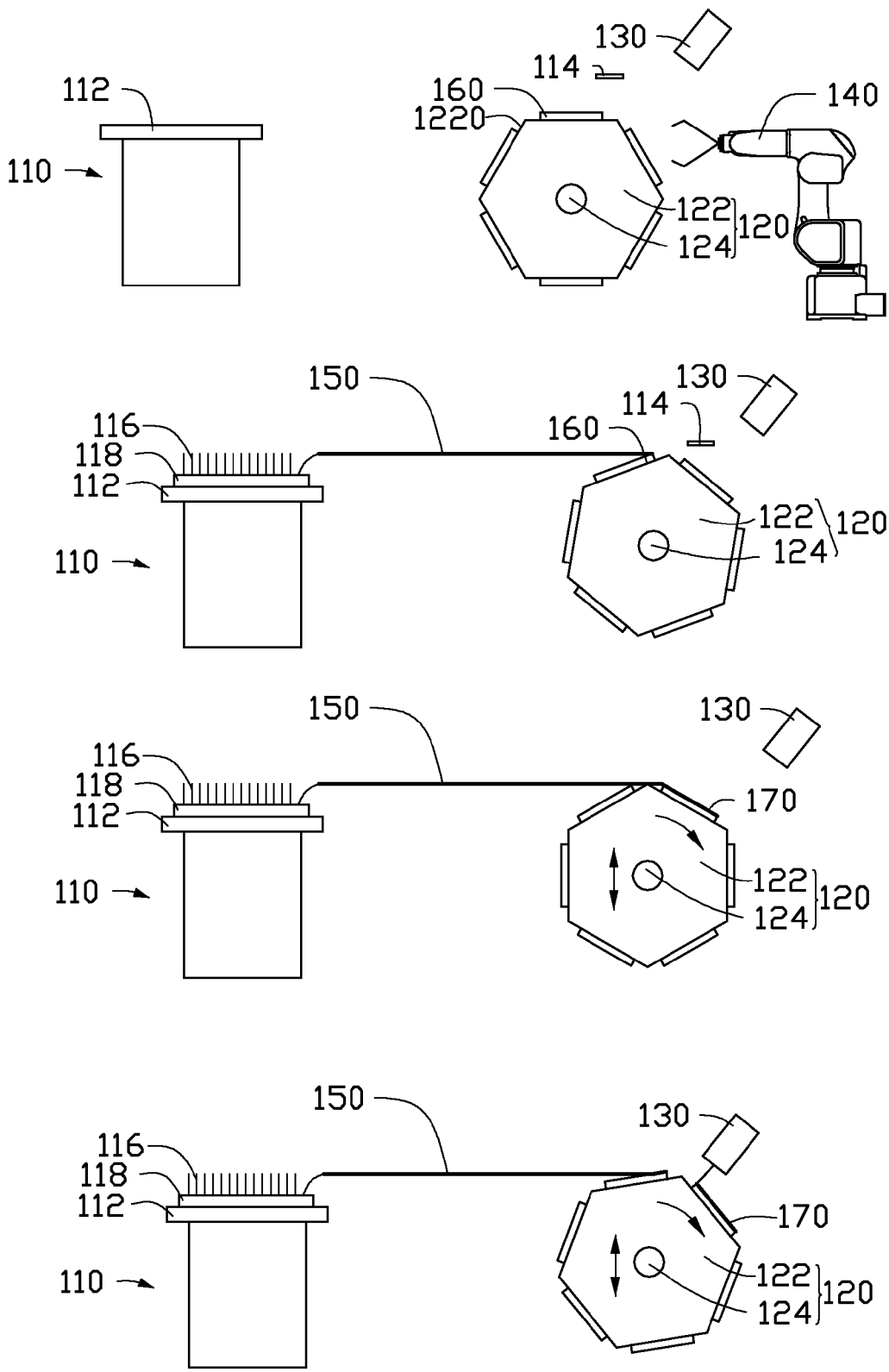
FIG. 3 is a process flow chart of a method for applying a carbon nanotube film according to one embodiment.

Referring to FIG. 3, a method for applying a carbon nanotube film 150 using the applying film apparatus 10 according to one embodiment is provided. The method for applying a film using the applying film apparatus 10 can execute continuously applying the carbon nanotube film, and includes the following steps:

(a) placing at least one pre-laid supporter 160 on the film application device 120;

(b) providing the carbon nanotube film 150 from a carbon nantoube array 116 located on the supplier 110, wherein one end of the carbon nanotube film 150 makes contact with one of the at least one pre-laid supporter 160;

(c) rotating the rotator 122 about the rotation axis 124, thereby the carbon nanotube film 150 being laid on the at least one pre-laid supporter 160; and (d) cutting the carbon nanotube film 150 with the cutter 130.

The step (a) can be executed by placing the at least one pre-laid supporter 160 on the support surfaces 1220 of the rotator 122 with the at least one mechanical arm 140, clamps or human hands. Each pre-laid supporter 160 can have a given shape, and can support the carbon nanotube film 150. The pre-laid supporter 160 can be a substrate, or a fixed frame. A material of the pre-laid supporter 160 can be metal, plastic, rubber or glass. In one embodiment, each support surface 1220 is placed on one pre-laid supporter 160. The pre-laid supporters 160 are quadrate metal plates.

In one embodiment, the step (b) includes the following substeps:

(b10) providing the carbon nanotube array 116 on the substrate 118;

(b20) fixing the substrate 118 with the carbon nanotube array 116 on the supplier 110;

(b30) drawing the carbon nanotube film 150 from the carbon nanotube array 116 by the drawing tool 114; and (b40) adhering the end of the carbon nanotube film 150 to the one of the at least one pre-laid supporter 160.

In step (b10), the carbon nanotube array 116 can be a super-aligned carbon nanotube array. The super-aligned carbon nanotube array includes a plurality of carbon nanotubes substantially parallel to each other and approximately perpendicular to the substrate. The carbon nanotubes in the super-aligned carbon nanotube array are closely packed together by the van der Waals attractive force. The plurality of carbon nanotubes in the super-aligned carbon nanotube array can have a height of about 200 to about 400 microns.

The following steps can be used to form the super-aligned carbon nanotube array: providing a substantially flat and smooth substrate 118; forming a catalyst layer on the substrate 118; annealing the substrate 118, with the catalyst layer, in air at a temperature in an approximate range from about 700° C. to about 900° C. for about 30 to 90 minutes; heating the substrate 118 with the catalyst layer at a temperature in an approximate range from about 500° C. to about 740° C., in a furnace with a protective gas; and supplying a carbon source gas to the furnace for about 5 minutes to about 30 minutes and growing the super-aligned carbon nanotube array on the substrate 118. The super-aligned carbon nanotube array formed under the above conditions is essentially free of impurities, such as carbonaceous or residual catalyst particles.

In step (b20), the substrate 118 having the carbon nanotube array 116 can be fixed on the specimen holder 112 of the supplier 110 via adhesive, adhesive tape, clasps, or vacuum suction.

Step (b30) further includes the substeps of: selecting a plurality of carbon nanotubes from the carbon nanotube array 116 by the drawing tool 114, wherein the plurality of carbon nanotubes has a predetermined width; and pulling the plurality of carbon nanotubes along the drawing direction at an even/uniform speed to form the carbon nanotube film 150. During the pulling process, as the initial carbon nanotubes are drawn out, other carbon nanotubes are also drawn out end to end, due to the van der Waals attractive force between ends of adjacent segments. The carbon nanotube film 150 produced in such manner can be selectively formed having a predetermined width.

The carbon nanotube film 150 includes a plurality of successive carbon nanotubes joined end-to-end by van der Waals attractive force therebetween. The carbon nanotubes are oriented primarily along a same orientation and are substantially parallel to each other. The carbon nanotubes are joined end-to-end to form a free-standing structure. "Free-standing" means that the carbon nanotube film 150 does not need to be supported by a substrate and can sustain the weight of itself when it is hoisted by a portion thereof without tearing. The carbon nanotubes in the carbon nanotube film 150 are substantially parallel to the pulling direction of the carbon nanotube film 150.

In step (b40), because the carbon nanotubes in the carbon nanotube array 116 have a high purity and a high specific surface area, the carbon nanotube film 150 is adhesive. As such, the carbon nanotube film 150 can be adhered to the pre-laid supporter 160 directly.

In step (c), the rotator 122 rotates around the rotation axis 124 to form the carbon nanotube film 150 from the carbon nanotube array 116. The carbon nanotube film 150 is laid on the pre-laid supporters 160. In one embodiment, the film application device 120 is placed on the right side of the supplier 110, and the rotator 122 rotates. The rotation axis 124 moves up and down, along a direction of substantially perpendicular to the surface of the carbon nanotube film 150, under a control device, which brings the rotator 122 to move up and down along the direction substantially perpendicular to the surface of the carbon nanotube film 150. The displacement of the rotator 122 is controlled by the displacement of the rotation axis 124. The height of the rotator 122 can be adjusted to make the carbon nanotube film 150 keep at a same level by controlling the displacement of the rotation axis 124.

In one embodiment, the film application device 120 has a regular hexagon, a length of each side of the film application device 120 is marked as d, so that the distance of the displacement of the rotation axis 124 along a direction of being substantially perpendicular to the carbon nanotube film 150 is between 0 and $(1-\sqrt{3}/2)d$. A part of the carbon nanotubes are drawn to form the carbon nanotube film 150 by the rotating of the rotator 122. The surface of carbon nanotube film 150 gets gradually close to and slowly laid on a surface of the at least one pre-laid supporter 160. As such, the angle between the surface of the carbon nanotube film 150 and the surface of the at least one pre-laid supporter 160 gradually decreases. When the carbon nanotube film 150 is laid on the entire surface of the at least one pre-laid supporter 160, the at least one laid supporter 170 is formed. When the at least one pre-laid supporter 160 is a plurality of pre-laid supporters 160, the carbon nanotube film 150 can be gradually laid on the pre-laid supporters 160 in sequence under continuously circumrotating of the rotator 122.

In step (d), the carbon nanotube film 150 is cut down by a cutter 130 along a cutting line, after the carbon nanotube film 150 is laid on each of the at least one pre-laid supporter 160. The cutting is controlled by the computer program. When the at least one pre-laid supporter 160 is a plurality of pre-laid supporters 160, after the carbon nanotube film 150 is laid on one of the plurality of pre-laid supporters 160, the laid supporter 170 is formed. The carbon nanotube film 150 makes contact with other pre-laid supporter 160 adjacent the laid supporter 170, the carbon nanotube film 150 between the laid supporter 170 and the other pre-laid supporter 160 is cut down by the cutter 130. Simultaneously, the film application device 120 maintains operation, the carbon nanotube array 116 continuously supplies the carbon nanotube film 150 to the film application device 120, and the carbon nanotube film 150 is laid on the other pre-laid supporters 160 entirely to make other laid supporters 170.

It is to be understood that the step (d) can be executed, when the film application device 120 has stopped. Then, the film application device 120 is restarted to make the carbon nanotube film 150 lay on other pre-laid supporter 160.

The method for applying the carbon nanotube film 150 using the applying film apparatus 10 can further include a step (e) of changing the laid supporter 170 with another pre-laid supporter 160, then laying the carbon nanotube film 150 on the other pre-laid supporter 160, thereby the apparatus 10 executing continuously. When the laid supporter 170 is changed with the pre-laid supporter 160, the film application device 120 can be operated or stopped.

A method for applying multi-layer carbon nanotube films 150 on at least one pre-laid supporter 160 using the applying film apparatus 10 of one embodiment includes the following steps:

(w10) placing the at least one pre-laid supporter 160 on the film application device 120;

(w20) providing the carbon nanotube film 150 from a carbon nanotube array 116 located on the supplier 110, wherein, one end of the carbon nanotube film 150 makes contact with one of the at least one pre-laid supporter 160;

(w30) rotating the rotator 122 about the rotation axis 124, thereby the carbon nanotube film 150 is laid on the at least one pre-laid supporter 160 to form at least one laid supporter 170;

(w40) cutting the carbon nanotube film 150 with the cutter 130; and (w50) keeping the rotator 122 rotating to form multi-layer carbon nanotube films on the pre-laid supporter 160.

The step (w10) to step (w40) can be executed as the same as the step (a) to step (d).

The step (w50) is executed by repeating the step (w30) and the step (w40) in turn.

In one embodiment, when the carbon nanotubes in the multi-layer carbon nanotube films 150 are substantially arranged along the same direction, the multi-layer carbon nanotube films 150 can be made by the following steps. The rotator 122 is rotated for a given number of rotations. The carbon nanotube film is laid on the pre-laid supporters 160 for the given layers to form the multi-layer carbon nanotube films 150 on each pre-laid supporter 160. Then, the muti-layer carbon nanotube films 150 between the adjacent two pre-laid supporters 160 are cut down. For example, when the multi-layer carbon nanotube films 150 are five-layer carbon nanotube films 150, the five-layer carbon nanotube films 150 are formed by the following steps. The rotater 122 is rotated for five times. Five-layers of carbon nanotube film 150 is laid on each pre-laid supporter 160. The five-layers of carbon nanotube film 150 between the two adjacent pre-laid supporters 160 is cut down. It is noted that the carbon nanotube film between two adjacent pre-laid supporters 160 can be cut down after each rotation.

The applying film apparatus 10 also can be used to lay multi-layer crisscrossing carbon nanotube films 150 on the pre-laid supporter 160. The multi-layer crisscrossing carbon nanotube films 150 means that an arranged direction of the carbon nanotubes in adjacent carbon nanotube films 150 forms an angle of above 0 degrees and less than or equal to 90 degrees. The angle is related with a circumrotating angle of the pre-laid supporter 160 during the process of laying the carbon nanotube films 150. The circumrotating angle can be more than 0 degrees and less than 360 degrees. The circumrotating angle can be formed by making the support surface 1220 of the rotator 122 move to a given angle, or moving the pre-laid supporter 160 to the given angle by external force. The given angle is the same as the circumrotating angle. The carbon nanotube film 150 between the adjacent pre-supporters 160 is cut down after each layer of the carbon nanotube film 150 is applied to the pre-supporter 160.

The apparatus 10 and the method for applying carbon nanotube film 150 using the same have the following virtues. Firstly, the rotator 122 of the film application device 120 rotating about the rotation axis 124 can reduce the angle between the carbon nanotube film 150 and the pre-laid supporter 160 gradually. Air, between the carbon nanotube film 150 and the pre-laid supporter 160, can be effectively removed. The carbon nanotube film 150 can be uniformly laid on the pre-laid supporter 160. The carbon nanotube film 150 laid on the pre-laid supporter 160 is not folded, as such will not form black lines. Secondly, the film application device 120 can move along the direction that is perpendicular to the rotation axis 124, thus the carbon nanotube film 150 can be kept in a same level, which can prevent the carbon nanotube film 150 from breaking down. Thirdly, the apparatus 10 is easy to be manipulated and can realize automatic continuous applying carbon nanotube films 150. Fourthly, the apparatus 10 and method for applying the carbon nanotube film 150 can lay multi-layer carbon nanotube films 150 automatically, even can apply multi-layer crisscrossing carbon nanotube films 150.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for applying carbon nanotube film, comprising:
   (a) placing at least one pre-laid supporter on a film application device comprising a rotation axis and a rotator capable of rotating about the rotation axis; and wherein the rotator comprises a plurality of support surfaces, wherein the at least one pre-laid supporter is attached to the plurality of support surfaces;
   (b) drawing a carbon nanotube film from a carbon nanotube array that is supported by a supplier, and applying one end of the carbon nanotube film on one of the at least one pre-laid supporter;
   (c) rotating the rotator about the rotation axis such that the carbon nanotube film is applied on the at least one pre-laid supporter; and
   (d) cutting the carbon nanotube film with a cutter.

2. The method of claim 1, wherein the at least one pre-laid supporter is a plurality of pre-laid supporters, and each of the plurality of support surfaces of the rotator has one of the plurality of pre-laid supporters fixed thereon.

3. The method of claim 2, wherein the supplier comprises a specimen holder, that fixes the carbon nanotube array, and a drawing tool, that is configured to draw the carbon nanotube film from the carbon nanotube array.

4. The method of claim 3, wherein the step (b) comprises:
   providing the carbon nanotube array on a substrate;
   placing the substrate, with the carbon nanotube array thereon, on the specimen holder;
   drawing the carbon nanotube film from the carbon nanotube array by the drawing tool; and
   adhering the end of the carbon nanotube film to one of the plurality of pre-laid supporters.

5. The method of claim 4, wherein the step (c) further comprises continuously rotating the rotator such that the carbon nanotube film is continuously drawn and applied to the plurality of pre-laid supporters in sequence.

6. The method of claim 5, wherein the step (c) further comprises a step of moving the rotator along a direction that is substantially perpendicular to a surface of the carbon nanotube film, so that the carbon nanotube film is kept at the same level when the rotator rotates.

7. The method of claim 6, wherein the carbon nanotube film between two adjacent pre-laid supporters placed on the plurality of support surfaces is cut by the cutter.

8. A method for applying carbon nanotube film, comprising the steps of:
   (a) placing at least one pre-laid supporter on a film application device, wherein the film application device comprises a rotation axis and a rotator capable of rotating about the rotation axis, the rotator has a plurality of support surfaces, and the at least one pre-laid supporter is attached on the plurality of support surfaces;
   (b) drawing a carbon nanotube film from a carbon nanotube array that is supported by a supplier, and adhering one end of the carbon nanotube film to one of the at least one pre-laid supporter;
   (c) rotating the rotator about the rotation axis such that a layer of the carbon nanotube film is applied on the at least one pre-laid supporter;
   (d) cutting the carbon nanotube film with a cutter; and
   (e) keeping the rotator rotating to lay multiple single layers of carbon nanotube film on the at least one pre-laid supporter.

9. The method of claim 8, wherein the step (c) further comprises a step of moving the rotator along a direction substantially perpendicular to a surface of the carbon nanotube film, so that the carbon nanotube film is kept at the same level when the rotator rotates.

10. The method of claim 8, wherein the multiple single layers of carbon nanotube film are crisscrossing carbon nanotube films, the step (e) further comprises a step of rotating the at least one pre-laid supporter at a given angle to lay the carbon nanotube film on the at least one laid supporter to form the multiple single layers crisscrossing carbon nanotube films; and a step of second-cutting the carbon nanotube film after each single layer of carbon nanotube film is applied on the at least one pre-laid supporter.

11. The method of claim 10, wherein the given angle is above 0 degrees and less than 360 degrees.

12. The method of claim 11, wherein the given angle is formed by moving the plurality of support surfaces of the rotator, or by moving the at least one pre-laid supporter.

13. The method of claim 8, wherein the multiple single layers of carbon nanotube film comprise a plurality of carbon nanotubes substantially arranged along the same direction, the step (d) is executed after the step (e), and the step (d) is cutting the carbon nanotube film after the multiple single layers of carbon nanotube film are applied on the at least one pre-laid supporter.

14. A method for applying carbon nanotube film, comprising the steps of:
- (a) fixing at least one pre-laid supporter on a plurality of support surfaces surrounding a rotation axis, and the plurality of support surfaces capable of rotating about the rotation axis;
- (b) drawing a carbon nanotube film from a carbon nanotube array placed on a supplier, applying one end of the carbon nanotube film to the at least one pre-laid supporter;
- (c) rotating the plurality of support surfaces about the rotation axis, such that the carbon nanotube film is applied on the at least one pre-laid supporter; and
- (d) cutting the carbon nanotube film with a cutter.

15. The method of claim 14, wherein the at least one pre-laid supporter is a plurality of pre-laid supporters, and each of the plurality of support surfaces has one of the plurality of pre-laid supporters fixed thereon.

16. The method of claim 15, wherein the supplier comprises a specimen holder that fixes the carbon nanotube array and a drawing tool configured to draw the carbon nanotube film from the carbon nanotube array.

17. The method of claim 16, wherein the step (b) comprises:
- providing the carbon nanotube array on a substrate;
- placing the substrate with the carbon nanotube array thereon on the specimen holder;
- using the drawing tool to draw the carbon nanotube film from the carbon nanotube array; and
- adhering the end of the carbon nanotube film to one of the plurality of pre-laid supporters.

18. The method of claim 17, wherein the rotator rotates such that the carbon nanotube film is continuously drawn and attached to the plurality of supporters in sequence.

19. The method of claim 18, wherein the step (c) further comprises a step of moving the rotator along a direction substantially perpendicular to a surface of the carbon nanotube film, so that the carbon nanotube film is kept at the same level when the rotator rotates.

20. The method of claim 18, wherein the carbon nanotube film between two adjacent pre-laid supporters placed on the plurality of support surfaces is cut by the cutter.

* * * * *